United States Patent
Bekele et al.

(10) Patent No.: US 12,431,982 B2
(45) Date of Patent: Sep. 30, 2025

(54) DIRECT DETECTION OF MODULATED COHERENT OPTICAL SIGNALS BY MEANS OF A STRUCTURE EXHIBITING FANO RESONANCE

(71) Applicant: Danmarks Tekniske Universitet, Kongens Lyngby (DK)

(72) Inventors: Dagmawi Alemayehu Bekele, Kongens Lyngby (DK); Michael Galili, Kongens Lyngby (DK); Kresten Yvind, Kongens Lyngby (DK); Leif Katsuo Oxenløwe, Kongens Lyngby (DK); Jesper Mørk, Kongens Lyngby (DK)

(73) Assignee: Danmarks Tekniske Universitet, Kongens Lyngby (DK)

( * ) Notice: Subject to any disclaimer, the term of this patent is extended or adjusted under 35 U.S.C. 154(b) by 230 days.

(21) Appl. No.: 18/258,168

(22) PCT Filed: Jan. 19, 2022

(86) PCT No.: PCT/EP2022/051158
§ 371 (c)(1),
(2) Date: Jun. 16, 2023

(87) PCT Pub. No.: WO2022/157210
PCT Pub. Date: Jul. 28, 2022

(65) Prior Publication Data
US 2024/0056196 A1    Feb. 15, 2024

(30) Foreign Application Priority Data
Jan. 20, 2021  (EP) .................... 21152503

(51) Int. Cl.
*H04B 10/61*  (2013.01)
*H04B 10/40*  (2013.01)
*H04B 10/50*  (2013.01)

(52) U.S. Cl.
CPC .......... *H04B 10/615* (2013.01); *H04B 10/40* (2013.01); *H04B 10/50* (2013.01)

(58) Field of Classification Search
None
See application file for complete search history.

(56) References Cited

U.S. PATENT DOCUMENTS

| | | | |
|---|---|---|---|
| 7,116,917 B2 | 10/2006 | Miyamoto et al. | |
| 7,117,917 B2 | 10/2006 | Allsopp | |
| (Continued) | | | |

FOREIGN PATENT DOCUMENTS

| | | |
|---|---|---|
| CN | 109669239 A | 4/2019 |
| CN | 110441858 A | 11/2019 |
| WO | WO 2019/199650 A1 | 10/2019 |

OTHER PUBLICATIONS

Bekele, Dagmawi et al., "In-Plane Photonic Crystal Devices using Fano Resonances" Laser Photonics Rev., 2019, pp. 1-17, No. 1900054.
(Continued)

*Primary Examiner* — Darren E Wolf
(74) *Attorney, Agent, or Firm* — Knobbe, Martens, Olson & Bear, LLP

(57) ABSTRACT

A waveguide-coupled cavity structure configured to exhibit Fano resonance (such as asymmetric Fano resonance or symmetric Fano resonance (inverse Lorentzian resonance), is utilized in an optical receiver or a method for direct detection of coherent optical signals by converting a phase-modulation on a coherent optical signal into an intensity-modulation of the optical signal. The waveguide-coupled cavity structure is designed for a transmission spectrum of the Fano resonance to overlap with a spectrum of the In modulated coherent optical signal to suppress transmission of at least one sideband of the modulated coherent optical signal through the structure, the sideband suppression being
(Continued)

asymmetrical with respect to the carrier frequency of the modulated coherent optical signal. The invention may be used for direct detection of more advanced coherent modulation formats such as quadrature phase-shift keying (QPSK) signals and high order quadrature amplitude modulation (n-QAM) signals.

25 Claims, 7 Drawing Sheets

(56) References Cited

U.S. PATENT DOCUMENTS

| | | | |
|---|---|---|---|
| 8,032,036 B2 | 10/2011 | Chen et al. | |
| 8,165,477 B2 | 4/2012 | Shiori et al. | |
| 8,406,638 B2 | 3/2013 | Hoshida | |
| 8,886,049 B2 | 11/2014 | Caplan et al. | |
| 10,075,245 B2 | 9/2018 | Caplan et al. | |
| 10,164,765 B2 | 12/2018 | Dolgin et al. | |
| 10,191,215 B2 * | 1/2019 | Kippenberg | G02B 6/1228 |
| 10,739,390 B2 * | 8/2020 | Claussen | G01R 29/0871 |
| 2005/0248823 A1 * | 11/2005 | Maleki | H04B 10/2575 |
| | | | 359/245 |
| 2008/0095490 A1 * | 4/2008 | Ashkenazi | G02B 6/138 |
| | | | 385/13 |
| 2010/0111540 A1 | 5/2010 | Caplan | |
| 2018/0091232 A1 | 3/2018 | Dolgin et al. | |
| 2019/0319714 A1 * | 10/2019 | Kowalevicz | H04B 10/11 |

OTHER PUBLICATIONS

European Search Report for EP 21152503 dated Jul. 2, 2021.
International Search Report for PCT/EP2022/051158.

* cited by examiner

Fig. 5A  Fig. 5B  Fig. 5C
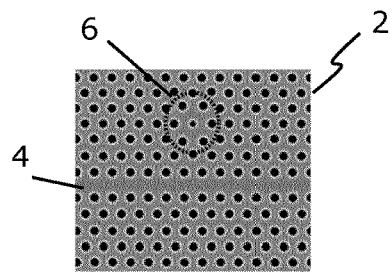 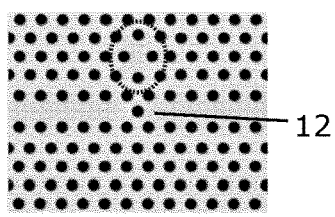 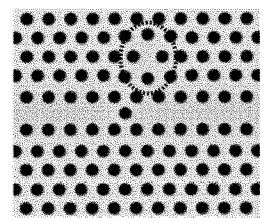
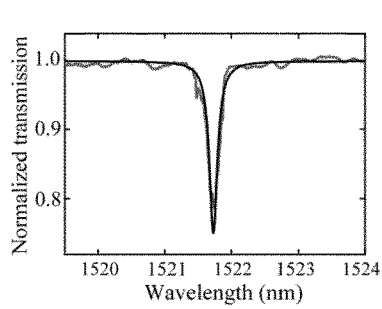 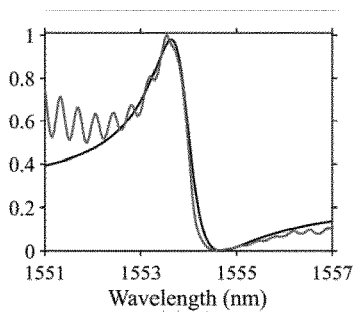 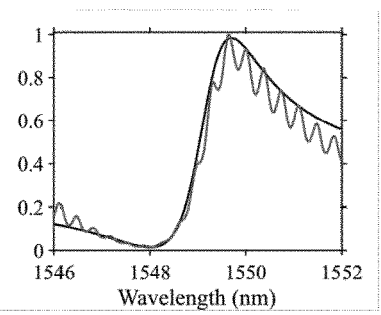
Fig. 6A  Fig. 6B  Fig. 6C
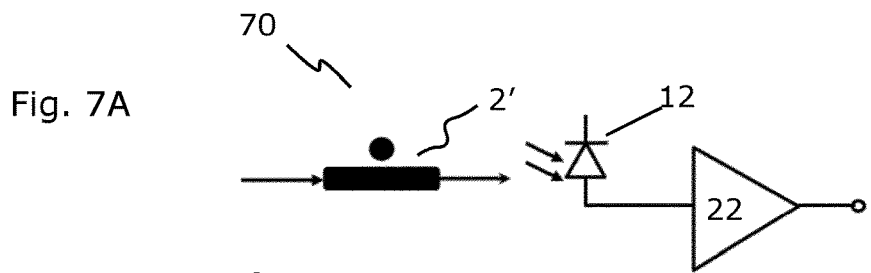
Fig. 7A
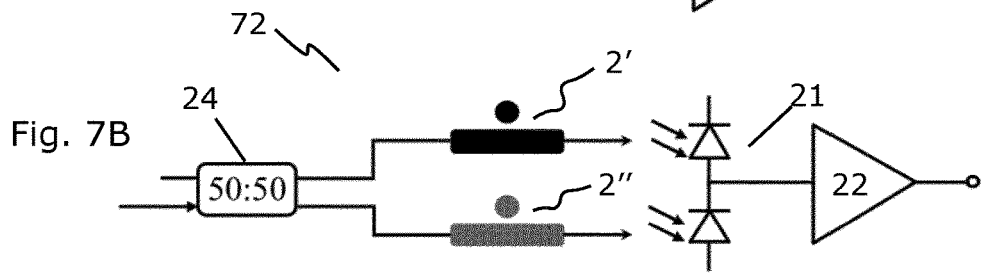
Fig. 7B
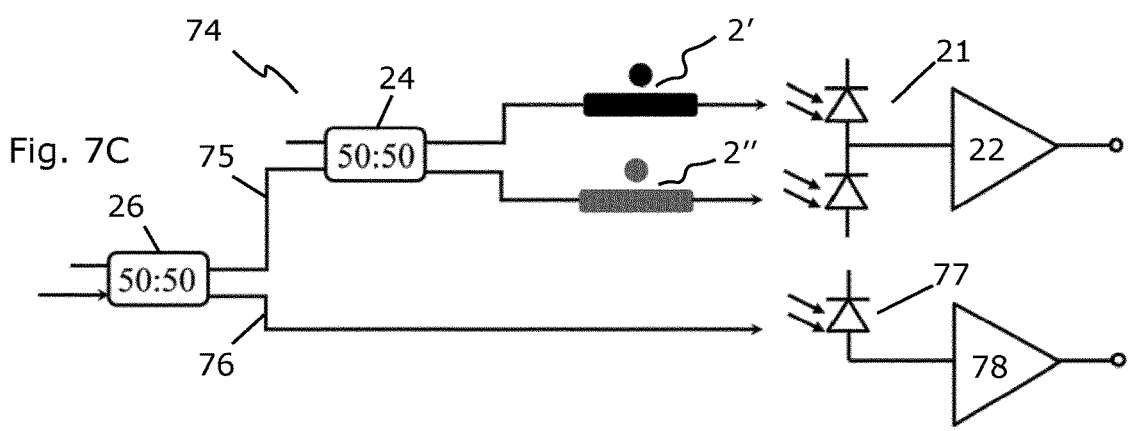
Fig. 7C

DIRECT DETECTION OF MODULATED COHERENT OPTICAL SIGNALS BY MEANS OF A STRUCTURE EXHIBITING FANO RESONANCE

CROSS REFERENCE TO RELATED APPLICATIONS

This application is a U.S. National Phase Application of PCT International Application Number PCT/EP2022/051158, filed on Jan. 19, 2022, designating the United States of America and published in the English language, which is an International Application of and claims the benefit of priority to European Patent Application No. 21152503.5, filed on Jan. 20, 2021. The disclosures of the above-referenced applications are hereby expressly incorporated by reference in their entireties.

TECHNICAL FIELD

The invention relates to optical receivers and the direct detection of modulated coherent optical signals, in particular conversion of a phase-modulation of a coherent optical signal into an intensity modulation on the optical signal.

BACKGROUND

The optical receiver is a critical element of an optical communication system. The function of the optical receiver is to convert the optical signal into the electrical domain so that the data being transmitted can be extracted and processed. In order to increase bandwidths, contemporary optical signals are modulated by encoding information onto amplitude and/or phase of the carrier signal.

In direct detection, a photodetector responds to changes in the optical power of a received optical signal. Direct detection is usually at the end of any optical receiver and is where the conversion from the optical to the electrical domain happens. The photodetector is typically speed limited, and it cannot extract any phase or frequency information from an optical signal having constant power. Therefore, a received optical signal typically goes through various stages of de-multiplexing and conversion before being detected by direct detection.

In coherent detection, both amplitude and phase information are extracted from the received optical signal. In a typical optical coherent receiver, a narrow-linewidth tunable laser serving as a local oscillator (LO) is combined with the received optical signal and the resulting mixing product—the superimposed waves—is then detected by balanced detectors. A balanced detector consists of two photodetectors connected back-to-back. With proper polarization orientation, frequency detuning, and phase matching conditions of the LO and the received signals. The resulting photocurrent contains both the amplitude and phase information of the received optical signal and both can be extracted by the use of a digital signal processor (DSP).

In order to realize ultrafast optical transmission rates, optical signals are modulated using advanced coherent modulation formats such as quadrature phase shift keying (QPSK), and high order quadrature amplitude modulation (QAM). Optical receivers for detecting such signals typically falls in one of two classes: coherent optical receivers such as U.S. Pat. No. 8,406,638 and filter-based optical receivers such as U.S. Pat. No. 10,075,245.

SUMMARY

In one implementation, this disclosure provides an optical receiver for detecting a modulated coherent optical signal, comprising:
a waveguide-coupled cavity structure comprising an optical waveguide having an input port for receiving an optical signal and an output port for providing an output optical signal, wherein the waveguide-coupled cavity structure is configured to exhibit Fano resonance and wherein the waveguide-coupled cavity structure is designed for a transmission spectrum of the Fano resonance to overlap with a spectrum of a received modulated coherent optical signal to suppress transmission of at least one sideband of the modulated coherent optical signal through the structure, the sideband suppression being asymmetrical with respect to a carrier frequency of the modulated coherent optical signal; and
a photodetector arranged to receive the output optical signal from the output port.

In the present disclosure, a coherent optical signal is any signal originating from a coherent light source, for example a laser. The coherent optical signal is modulated in that information has been encoded thereon by means of one or more of a phase, frequency or amplitude modulation using any prior art modulation technique. The degree of coherence of an optical signal is typically quantified by the coherence time or coherence length of the electromagnetic (EM) wave. Generally, the degree of coherence depends on the light source and the 'transmission history' such as the media through which the signal has traversed as well its pathlength.

In optics, a Fano resonance arises due to interference between a discrete optical mode and a continuum of optical modes leading to characteristic lineshapes in the transmission or reflection spectrum. Device structures for realizing Fano resonances can be classified into in-plane and out-of-plane structures corresponding to the propagation of light with respect to the device plane. In both cases, the Fano interference occurs when light propagates in a structure or medium supporting the continuum of modes, which has an optical distance to an optical cavity supporting the discrete optical mode. This allows excitation of the discrete optical mode from the mode-continuum. The optical distance, also referred to as the optical path length, is the product of the geometric length of the path followed by light through a given system and the refractive index of the medium through which it propagates. Such combinations of structures are said to exhibit Fano resonance. The characteristic lineshapes are summarized later, but it is noted that modifications to the design of the physical structures may give rise to modifications in the resulting lineshapes to make them deviate from the characteristic lineshapes. As long as the physical principle behind such modified lineshapes is the interference between a discrete optical mode and a continuum of optical modes, these are referred to as Fano resonances. In this disclosure, the term 'Fano resonance' is therefore to be interpreted as covering asymmetric Fano resonances as well as symmetric Fano resonances, also referred to as Inverse Lorentzian resonances. These resonances arise when a coherent optical signal is coupled into a waveguide-coupled cavity structure designed for Fano interference to occur at the wavelength of the optical signal. Such structures are said to be configured to exhibit Fano resonance.

Preferably, the optical waveguide supports a continuum of modes and the waveguide-coupled cavity structure comprises an optical cavity supporting a discrete mode with resonance frequency, ($\omega_0$, with the optical waveguide being arranged within an optical distance of the optical cavity to allow evanescent excitation of the discrete cavity mode from the mode-continuum.

Structures exhibiting Fano resonances have been used for realizing various optical signal processing functionalities in the prior art. A good overview of such structures is provided in the paper "In-Plane Photonic Crystal Devices using Fano Resonances", Bekele et. al, Laser Photonics Rev. 2019, 1900054.

The disclosure also provides an optical communication kit comprising an optical transmitter comprising a coherent light source and at least one optical phase modulator for encoding data onto light from the coherent light source to form a modulated coherent optical signal;

an optical receiver as specified above for receiving and detecting the modulated coherent optical signal.

Such kit consisting of corresponding optical transmitter and receiver provides a simple and cost-efficient solution for signal transfer.

The disclosure further provides a method for converting a phase-modulation on a coherent optical signal into an intensity-modulation of the optical signal, comprising coupling the coherent optical signal into an optical waveguide of the cavity structure which exhibits Fano resonance, wherein a transmission spectrum of the Fano resonance overlaps with a spectrum of the coherent optical signal to suppress transmission of at least one sideband of the coherent optical signal through the optical waveguide, the sideband suppression being asymmetrical with respect to a carrier frequency of the coherent optical signal.

The disclosure further provides use of a waveguide-coupled cavity structure which exhibits Fano resonance for converting phase-modulation of a coherent optical signal into an intensity-modulation of the optical signal, wherein the coherent optical signal is coupled into an optical waveguide of the cavity structure and wherein a transmission spectrum of the Fano resonance overlaps with a spectrum of the coherent optical signal to suppress transmission of at least one sideband of the coherent optical signal through the optical waveguide, the sideband suppression being asymmetrical with respect to a carrier frequency of the coherent optical signal.

In one embodiment, the use is in an optical receiver for detecting a phase modulation of a modulated coherent optical signal.

In another embodiment, the use is for optical format conversion, preferably for converting a phase modulation format of a modulated coherent optical signal into an intensity modulation format. This use may be in an optical format converter.

Hence, in a further embodiment, the disclosure provides an optical format converter for converting a phase modulation format of a modulated coherent optical signal into an intensity modulation format and comprising:

a waveguide-coupled cavity structure comprising an optical waveguide having an input port for receiving an optical signal and an output port for providing a converted output optical signal, wherein the waveguide-coupled cavity structure is configured to exhibit Fano resonance and wherein the waveguide-coupled cavity structure is designed for a transmission spectrum of the Fano resonance to overlap with a spectrum of a received modulated coherent optical signal to suppress transmission of at least one sideband of the modulated coherent optical signal through the structure, the sideband suppression being asymmetrical with respect to a carrier frequency of the modulated coherent optical signal.

The above embodiments are advantageous in that they provide an all-optical method of converting phase changes in an optical signal into optical intensity variations. These embodiments are also advantageous in that they enable direct detection of modulated coherent optical signals. These implementations are further advantageous in that they allow for detection of modulated coherent optical signals without the need for a local oscillator (LO) laser and digital signal processing (DSP). The embodiments are further advantageous since they may also be used for direct detection of more advanced coherent modulation formats such as quadrature phase-shift keying (QPSK) signals and high order quadrature amplitude modulation (n-QAM) signals.

In the following, a number of preferred and/or optional features, elements, and examples will be summarized. Features or elements described in relation to the optical receiver implementation may be combined with or applied to the other implementations or aspects where applicable. For example, structural and functional features applied in relation to the optical receiver implementation may also be used as features in relation to the use or the method and vice versa. Also, explanations of underlying mechanisms of the invention as realized by the inventors are presented for explanatory purposes, and should not be used in ex post facto analysis for deducing the invention.

In one embodiment, a local or global minimum in the transmission spectrum of the Fano resonance overlaps with a sideband of the modulated coherent optical signal. This is advantageous since this precise alignment of the minimum transmission with a sideband result in a stronger sideband-suppression than if the minimum transmission lies somewhere between two sidebands. Preferably, the minimum transmission overlaps with the sideband having largest amplitude. This is advantageous since it gives rise to the strongest sideband suppression.

In one embodiment, the resonance frequency of the optical cavity can be tuned to adjust the transmission spectrum of the Fano resonance in relation to the spectrum of the modulated coherent optical signal. This is advantageous since it allows for a precise tuning of a transmission minimum of the transmission spectrum to overlap with a desired sideband of the modulated coherent optical signal as described above.

In a preferred embodiment, the optical receiver is part of a balanced receiver setup. This is advantageous since it supresses noise.

BRIEF DESCRIPTION OF THE FIGURES

FIGS. 5A-C are scanning electron microscope images of photonic crystal structures exhibiting different types of Fano resonances.

FIGS. 6A-C are graphs showing the Fano lineshapes of the corresponding photonic crystal structures of FIGS. 5A-C.

FIGS. 7A-C illustrates setups for direct detection of different coherent modulation formats according to embodiments of this disclosure.

DETAILED DESCRIPTION

The resonance spectrum of an optical cavity is characterized by having a symmetric-lineshape known as a Lorentzian resonance, peaking at the resonance frequency $\omega_0$ and with a linewidth $\Delta\omega$. The ratio $(\omega_0/\Delta\omega)$ is a dimensionless measure of the temporal storage capacity of the cavity and is denoted the quality factor, Q. The classical Fano transmission spectrum can be written as:

$$T(\delta) = |t_B|^2 \frac{(q+\delta)^2}{1+\delta^2} \quad (1)$$

where $t_B$ is the non-resonant amplitude transmission coefficient of the system, q is the Fano asymmetry parameter or q-parameter, and the normalized frequency detuning is $\delta=(\omega-\omega_0)/\gamma$, where $\gamma$ is the cavity field decay rate given by $\gamma=\omega_0/2Q$. From Equation (1), it is seen that a transmission maximum of $T_{max}=|t_B|^2(q^2+1)$ appears at $\delta=1/q$, while a transmission minimum $T_{min}=0$ appears at $\delta=-q$.

Figure 1:
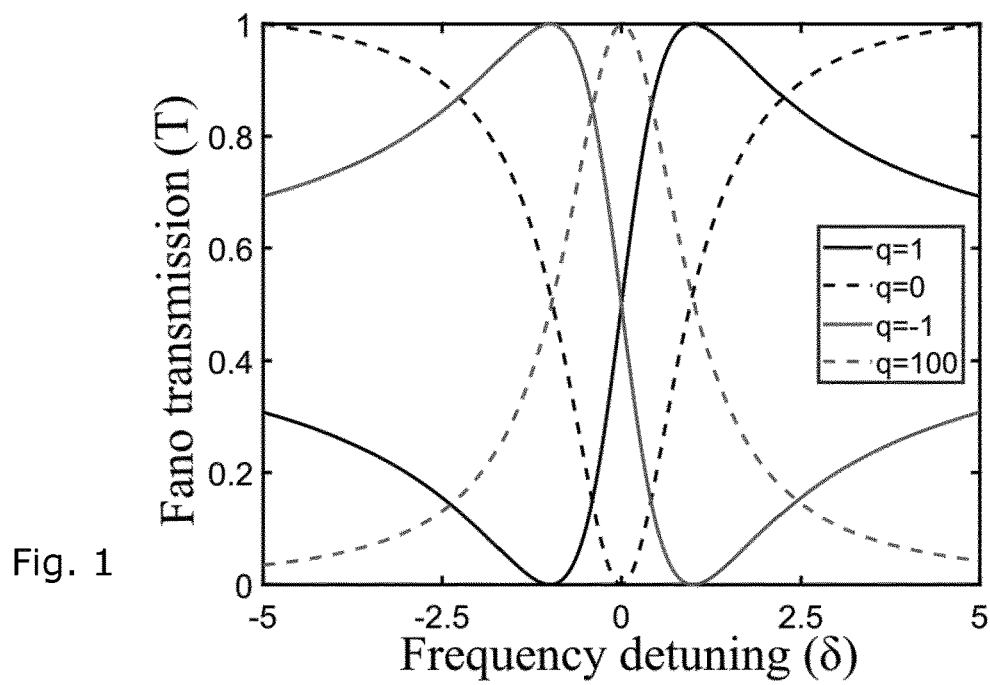
FIG. 1 is a graph showing characteristic lineshapes of Fano resonances as well as a lineshape of a Lorentzian resonance.

The Fano asymmetry parameter determines the lineshape profile of the resonance. FIG. 1 shows power transmission lineshapes as a function of wavelength detuning for four cases corresponding to q values of −1, 0, 1, and 100. The case of q=0 (dashed black line) shows a symmetric dip at the resonance frequency indicating the occurrence of destructive interference between the discrete mode and the continuum of modes. Here, this is referred to as a symmetric Fano resonance, while in some literature, it is denoted as an inverse Lorentzian or an antiresonance. The cases of q=−1 and q=1, shown by solid grey and solid black lines, respectively, correspond to asymmetric lineshapes, indicating the presence of both constructive and destructive interferences between the discrete mode and the continuum of modes. The spectral location of the transmission minimum is blue shifted (red shifted) compared to the transmission maximum for q=−1 (1). Hence, the lineshapes are often referred to as blue-parity or red-parity Fano resonances for negative and positive values of the Fano asymmetry parameter, respectively. In both cases, the resonance frequency is spectrally located midway between the transmission maximum and the transmission minimum. By carefully choosing the Fano q-parameter, it is possible to design an asymmetric Fano resonance in which the resonance frequency of the cavity is spectrally located anywhere between the transmission maximum and transmission minimum. The Fano transmission lineshapes corresponding to q values of −1, 0, and 1 are the characteristic lineshapes referred to previously. When, in this disclosure, a waveguide-coupled cavity structure is said 'to be configured to exhibit Fano resonance', it is meant that when a coherent optical signal having a predetermined wavelength is coupled into the waveguide-coupled cavity structure, asymmetric Fano resonance (corresponding to $q\approx-1$ or 1) or symmetric Fano resonance (corresponding to $q\approx 0$ and also referred to as Inverse Lorentzian resonance) resulting from interference between the discrete mode and the continuum of modes will arise.

Figure 2A:
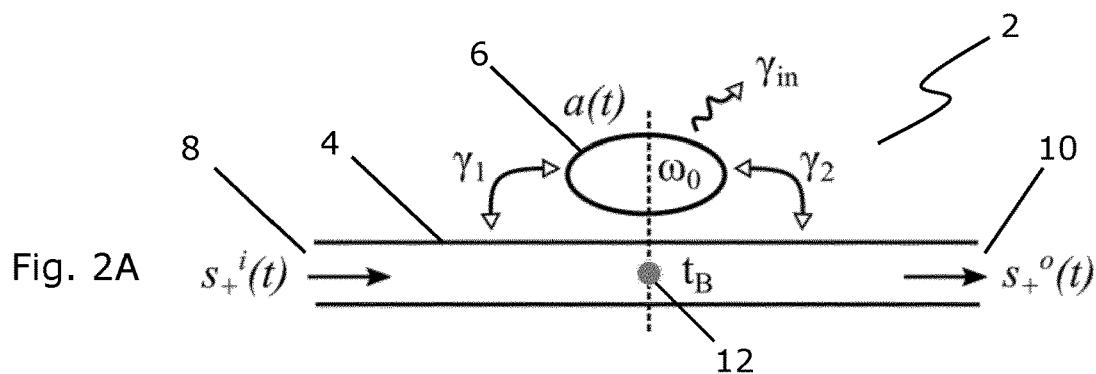
FIGS. 2A-C illustrate waveguide-coupled cavity structures exhibiting different types of Fano resonances.

FIG. 2A illustrates a waveguide-coupled cavity structure 2 comprising an optical waveguide 4 that supports a continuum of modes and an optical cavity 6 supporting a discrete mode. The optical waveguide 4 has an input port 8 for receiving an optical signal and an output port 10 for providing an output optical signal. The structure is excited with light of frequency $\omega_s$ via the input port, and the transmitted light is collected from the output port. The cavity has a resonance frequency of $\omega_0$ and its field amplitude is denoted by a(t). The cavity mode decays into the input and output ports with rates $\gamma_1$ and $\gamma_2$, respectively. The out-of-plane decay rate is $\gamma_{in}$. The rate of change of the cavity field can be written as $$\dot{a}(t)=(-i(\omega_0-\omega_s)-\gamma_1-\gamma_2-\gamma_{in})a(T)+\sqrt{2\gamma_1}e^{i\theta_1}s_+^i(t) \quad (2)$$

The first term in Eq. (2) represents the detuning-dependence of the amplitude of the cavity field envelope, and its decay, while the second term represents the coupling of the input field to the cavity field.

The output field amplitude of the structure is given by $$s_+^o(t)=-it_B s_+^i(t)+\sqrt{2\gamma_2}e^{i\theta_2}a(t), \quad (3)$$

where the first term represents the direct transmission of the input signal to the output port. The amplitude of this path is determined by the amplitude transmission coefficient of a partially transmitting element (PTE) 12. The second term in Eq. (3) represents the contribution of the cavity field to the output field. The interference of these two terms gives rise to a Fano resonance.

Figure 2B:
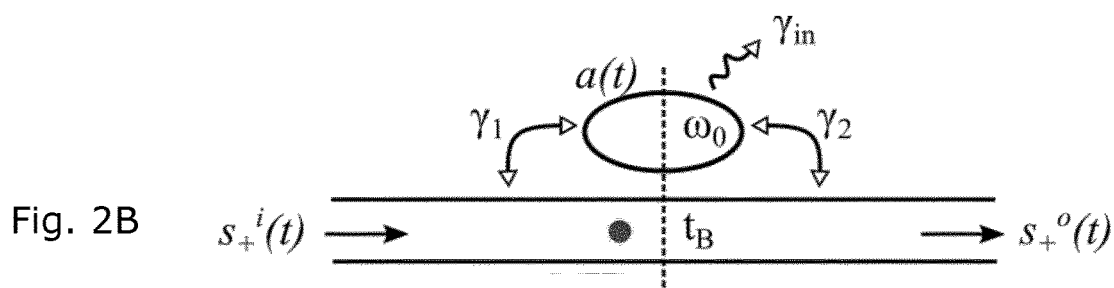
Figure 2C:
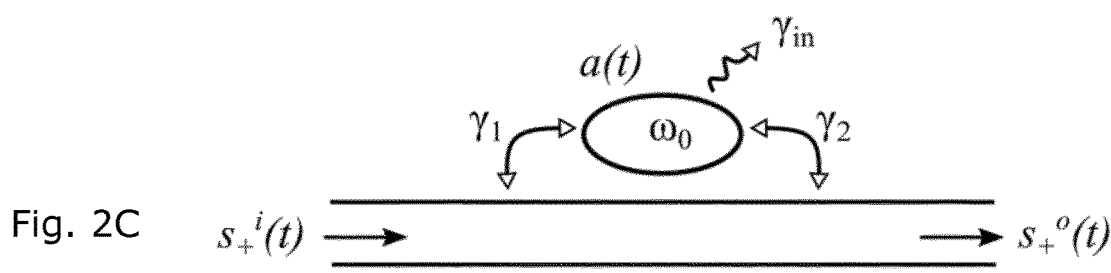

FIGS. 2A-C illustrates three different exemplary designs with different values of the Fano asymmetry parameter or q-parameter, q. FIG. 2A illustrates a design giving rise to a red-parity Fano Resonance corresponding to q=1 in Eq. (1) and the solid black line in FIG. 1. FIG. 2B illustrates a design giving rise to a blue-parity Fano Resonance corresponding to q=−1 in Eq. (1) and the solid grey line in FIG. 1. Finally, FIG. 2C illustrates a design giving rise to a symmetrical Fano Resonance, also referred to as an inverse Lorentzian resonance, corresponding to q=0 in Eq. (1) and the dashed black line in FIG. 1.

If the optical waveguide does not allow for direct transmission from the input port to the output port, transmission would only be possible via tunnelling through the cavity which would lead to conventional Fabry-Perot resonances with characteristic Lorentzian lineshape when the resonance is isolated from other modes. This is the special case of q=100 in Eq. (1) and shown as the dashed grey line In FIG. 1. The lineshape is a conventional Lorentzian lineshape at the cavity resonance with no features of interference between the discrete mode and the continuum of modes. Hence, this lineshape is not a Fano Resonance and is not the result of a structure exhibiting Fano-resonance.

Therefore, it is preferred that the optical waveguide of the waveguide-coupled cavity structure allows direct transmission of light from the input port to the output port.

According to the invention, phase modulated coherent optical signals can be converted to intensity modulated signals by using the Fano resonance structure to change the amplitude-equality and phase relationships among the optical carrier and the optical sidebands. This principle is illustrated by means of numerical simulations in the following with reference to FIGS. 3A-E.

Figure 3A:
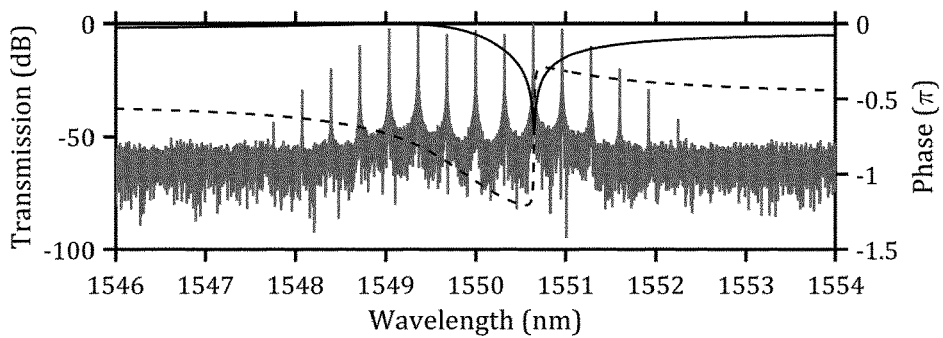
FIGS. 3A-E are graphs illustrating numerical simulation results demonstrating an embodiment of this disclosure.

FIG. 3A is a graph showing (solid grey line) a normalized optical spectrum of a 40 GHz phase modulated (PM) input signal. The PM spectrum is centred at 1550 nm, and it is composed of equidistant sidebands which are shifted by k times f m from the optical carrier, where f m is the phase modulation frequency. The graph also shows transmission spectrum of a waveguide-coupled cavity structure according to an embodiment of this disclosure exhibiting red-parity Fano resonance (solid black line), and the phase response (right ordinate) of the Fano resonance (dashed black line). For comparison with the lineshapes in FIG. 1, it should be noted that the Abscissa in FIG. 1 is frequency whereas it in FIG. 3A is wavelength.

Figure 3B:
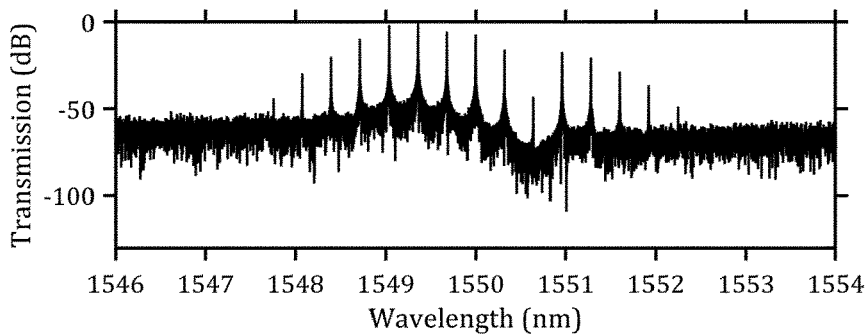

FIG. 3B shows the spectrum of the PM signal after transmission through the waveguide-coupled cavity structure according to an embodiment of this disclosure. The sideband amplitude and phases are altered proportional to the transmission lineshape of the Fano resonance. In particular, the transmission of the k=2 sideband is suppressed.

The minimum transmission of the transmission spectrum of the Fano resonance preferably overlaps with a sideband of the modulated coherent optical signal, as is the case in FIG. 3A. This is advantageous since this precise alignment of the minimum transmission with a sideband result in a stronger sideband-suppression than if the minimum transmission lies somewhere between two sidebands. Preferably, the minimum transmission overlaps with the sideband having largest amplitude. This is advantageous since it gives rise to the strongest sideband suppression as is the case in FIG. 3B. To ensure a desired overlap, the resonance frequency of the optical cavity may be tuned to adjust the transmission spectrum of the Fano resonance in relation to the spectrum or carrier signal of the modulated coherent optical signal.

Figure 3C:
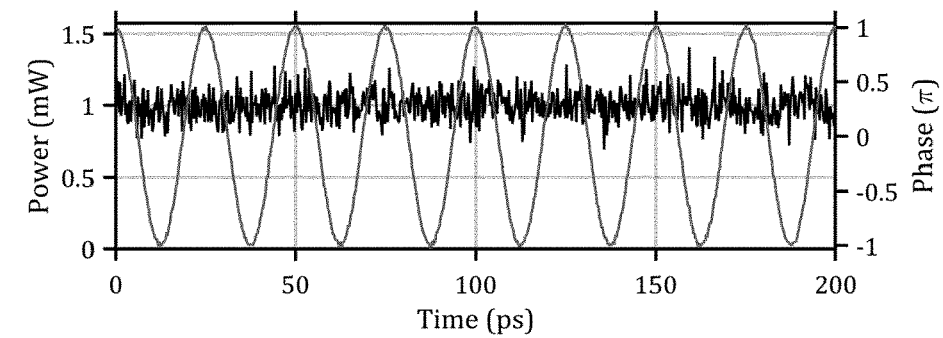
Figure 3D:
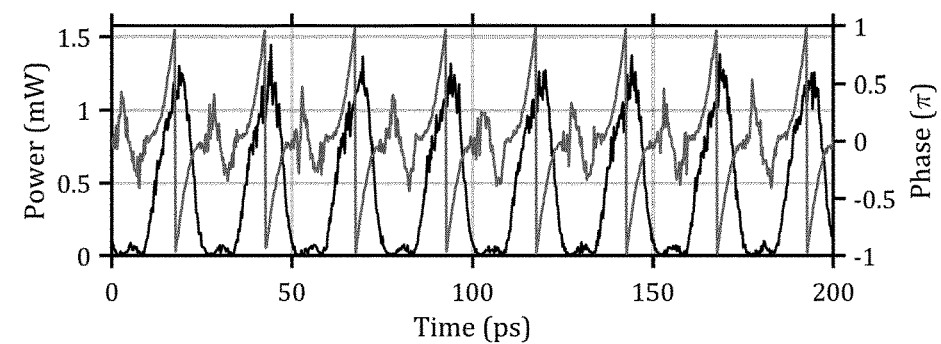
Figure 3E:
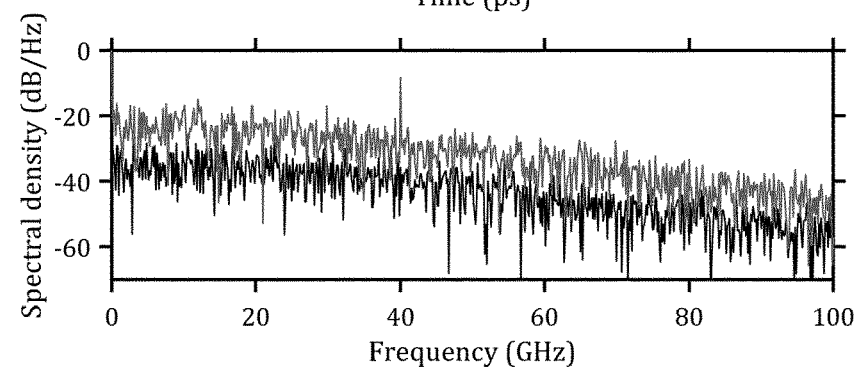

The time-dependent power and phase of the input PM signal and the converted intensity and phase modulated signal are compared in FIGS. 3C and 3D, respectively. The input PM signal has a constant power of 1 mW (black line). To model signal impairment due to propagation, additive white Gaussian noise is assumed corresponding to a signal-to-noise ratio (SNR) of 20 dB. The phase of the input PM signal (grey line) oscillates sinusoidally within the range [0, 2π] at 40 GHz corresponding to a period of 25 ps. On the other hand, the converted signal in FIG. 3D shows oscillating power (black line) between 0 and 1.2 mW with the same oscillation period as the phase of the input PM signal. A higher peak power is observed in the PM-to-IM converted signal than the average power of the input PM signal. The phase of the PM-to-IM converted signal shown in FIG. 3D (grey line) shows oscillations corresponding to the oscillation period of the PM input signal. The electrical power spectral density (PSD) of the input PM signal (black line) and the converted signal (grey line) are compared in FIG. 3E. The modulating radio-frequency (RF) signal at 40 GHz can be clearly seen in the electrical spectrum of the converted signal, whereas the modulating RF signal cannot be seen in the electrical spectrum of the input PM signal. This shows that amplitude imbalance between the sidebands has been achieved indicating intensity modulation in the converted signal. Note that the electrical spectrum of the PM signal is attenuated by dB for visual clarity.

Figure 4A:
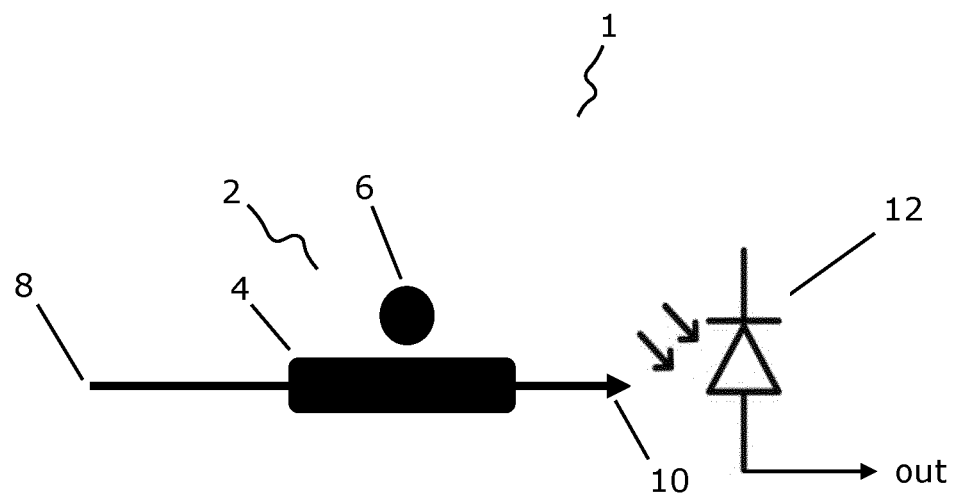
FIGS. 4A-E illustrates (4A) an optical receiver according to the disclosure and (4B-E) different physical implementations of the waveguide-coupled cavity structure.

In an embodiment shown in FIG. 4A, the invention provides an optical receiver 1 for detecting a modulated coherent optical signal and comprising a waveguide-coupled cavity structure 2 described in relation to FIGS. 2A-C and a photodetector 12 arranged to receive the output optical signal from the output port 10. The waveguide-coupled cavity structure 2 is configured to exhibit Fano resonance as described in relation to FIGS. 1 and 2A-C. Further, the waveguide-coupled cavity structure 2 is designed for a transmission spectrum of the Fano resonance to overlap with a spectrum of the modulated coherent optical signal to suppress transmission of at least one sideband of the modulated coherent optical signal through the structure, the sideband suppression being asymmetrical with respect to the carrier frequency of the modulated coherent optical signal, an example of this is illustrated in FIGS. 3A-B.

When a modulated coherent optical signal (example is illustrated in FIG. 3C) is input to the optical receiver 1 via input port 8, the waveguide-coupled cavity structure 2 provides a converted output optical signal (example is illustrated in FIG. 3D) via the output port 10. The photodetector 12, here a photodiode, detects the power (black line in FIG. 3D) of the output optical signal from the output port 10, and the output photocurrent from the photodiode contains the information modulated on the modulated coherent optical signal. The photocurrent can then be processed by electrical signal processing.

Figure 4B:
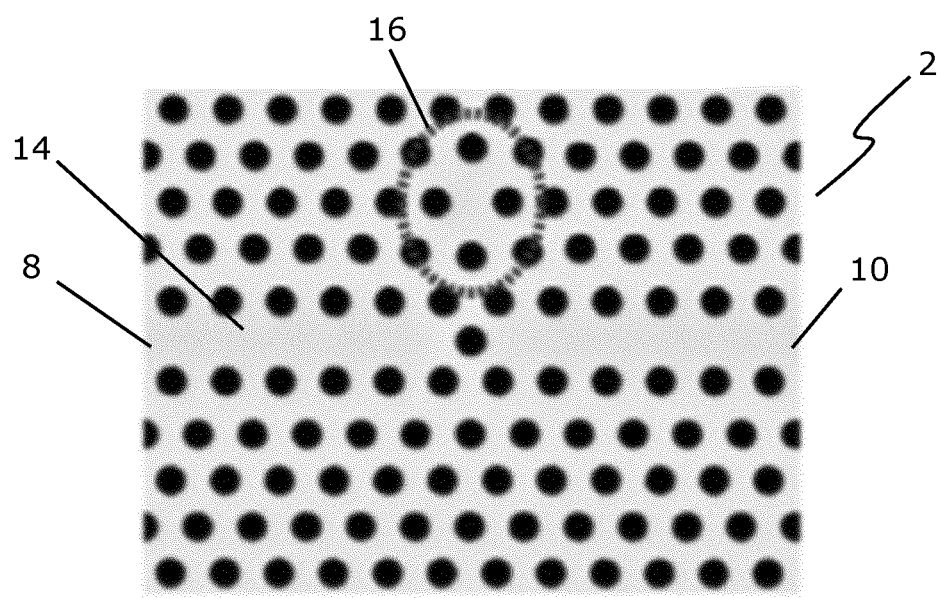

In one example, the waveguide-coupled cavity structure can be realized as an in-plane photonic crystal device as illustrated in FIG. 4B. FIG. 4B is a scanning electron microscope (SEM) image of an exemplary Fano structure realized using hexagonally arranged photonic crystal airholes on a 340 nm thick indium phosphide. The waveguide 14 is of line-defect type formed by removing one row of airholes, while the cavity 16 is an H0 nanocavity formed by shifting the airholes away from the center of the cavity. The typical radius of the airholes is around 120 nm, while the lattice constant of the photonic crystal is around 450 nm. The partially transmitting element is realized using a single airhole placed in the middle of the waveguide below the cavity. In a preferred embodiment, the resonance frequency of the optical cavity is tuned by thermo-optic effects, by heating of the material in which the photonic crystal structure of the cavity is formed. For this purpose, the optical receiver may comprise a heating element arranged to tune the resonance frequency of the optical cavity by heating the waveguide-coupled cavity structure.

Figure 4C:
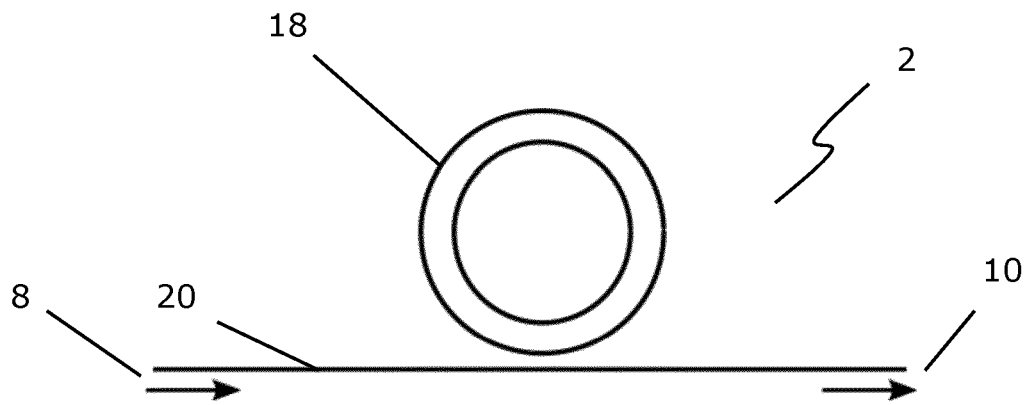

In another example, the waveguide-coupled cavity structure 2 can be realized as a ring resonator 18, including a racetrack resonator or loops of other shapes, side-coupled to a bus waveguide 20 as illustrated in FIGS. 4C and E. Similar to the photonic crystal device, the ring resonator 18 and the accompanying bus waveguide 20 can be realized on silicon-on-insulator, glass or other III-V semiconductor platforms. The typical diameter of a ring resonator in an exemplary embodiment of the invention is few tens of micrometres. The ring resonator may be designed by means of its dimensions and material composition to have its resonance frequency at or near the carrier frequency of the received optical signal. Design-parameters of ring resonators are well known in the art. The resonance frequency of the ring resonator may be tuned using thermo-optic effects, by heating the material in which the ring resonator is formed.

Figure 4D:
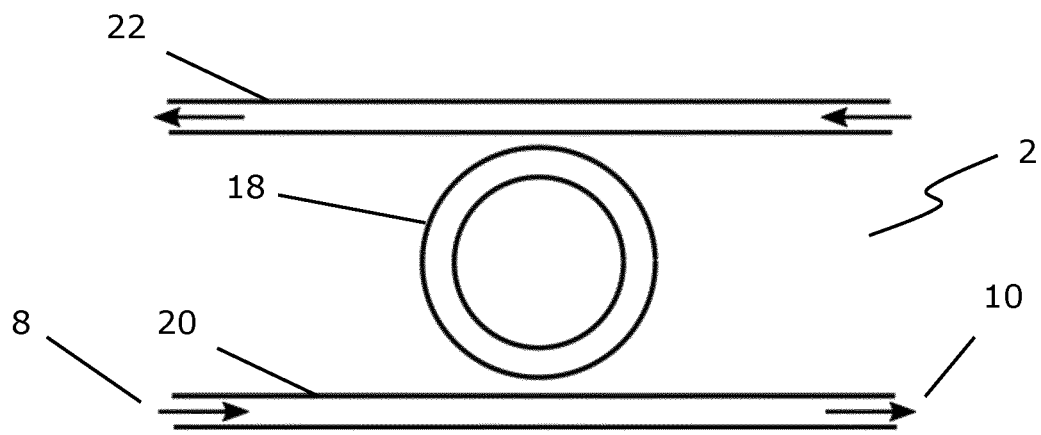
Figure 4E:
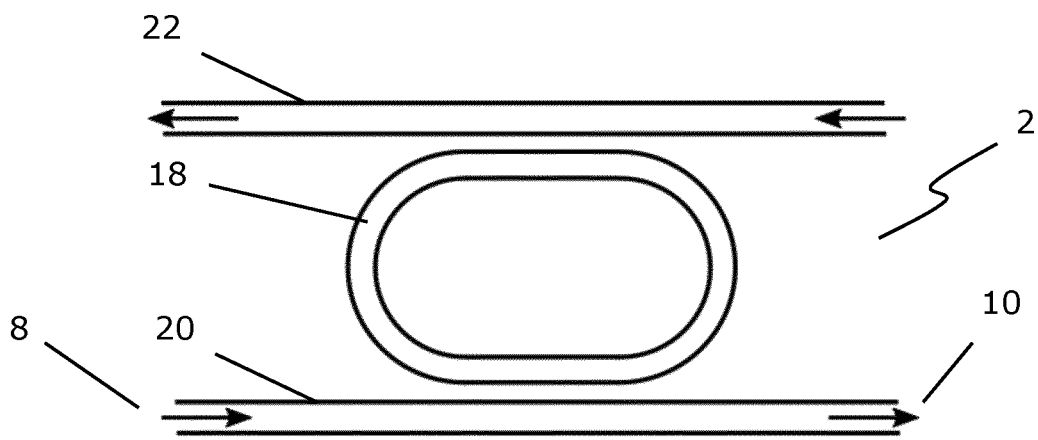

In an exemplary embodiment, a ring resonator may be coupled to two waveguides 20 and 22 on opposite sides of the ring as shown in FIGS. 4D and E. In such configuration, the additional waveguide 22 has the technical effect of a loss channel for radiation out of the ring resonator enabling the transmission at the resonance to drop to zero, thereby providing the advantage of achieving a higher extinction ratio.

This disclosure also provides a use and a method utilizing the waveguide-coupled cavity structure 2 described in relation to FIGS. 2A-C and comprised by the optical receiver 1.

This use and method follow from the utilization of the waveguide-coupled cavity structure 2 already described and also cover the uses and method steps corresponding to the embodiments of the optical receiver described in the following.

The waveguide-coupled cavity structures 2 described in relation to FIGS. 4A-C also embody an optical format converter according to an embodiment. Such optical format converters are equivalent to the receiver 1 omitting the photodetector 12. Hence, the use utilizing the waveguide-coupled cavity structure 2 for optical format conversion, preferably for converting a phase modulation format of a modulated coherent optical signal into an intensity modulation format, is also disclosed by the description of the receiver 1.

As discussed previously, modifications to the design of the optical waveguide and/or the waveguide-coupled cavity structure may give rise to modifications in the resulting transmission spectrum. In one embodiment, the optical waveguide comprises a partially transmitting element (PTE) which affects the Fano asymmetry parameter of the waveguide-coupled cavity structure, see also the discussion of Eq. (1) previously. This is advantageous since it may modify the shape and/or position of a transmission minimum of the transmission spectrum to improve an overlap with a sideband of the modulated coherent optical signal. The phase of the coupling between the waveguide and the cavity can be altered depending on the position of the PTE, thus determining the spectral location of the constructive and destructive interferences referred to as the maximum and minimum transmission points in the transmission spectrum, respectively. Additionally, placing the PTE to the left- or right-hand side of the mirror plane passing through the middle of the cavity (dashed line in FIGS. 2A and 2B) will result in breaking the symmetry of the structure leading to different decay rates for the cavity field to the input and the output ports. Moreover, the transmission coefficient of the waveguide can be controlled by the size of the PTE airhole. Large PTE radius results in low transmission of light through the waveguide.

FIGS. 5A-C are scanning electron microscope (SEM) images of waveguide-coupled cavity structures 2 according to exemplary embodiments of the invention realized using hexagonally-arranged photonic crystal airholes. FIGS. 6A-C are graphs showing the corresponding theoretical (Eq. (1)) transmission spectra (solid black lines) and the measured transmission spectra (solid grey lines).

The structure of FIG. 5A exhibits a symmetric Fano (or inverse Lorentzian) resonance shown in FIG. 6A. The cavity 6 is of quasi-H1 type formed by reducing the radius of the center airhole and shifting the airholes around the cavity away from the cavity center. Note that this structure does not have a PTE airhole in the waveguide.

The structure of FIG. 5B exhibits a red-parity Fano resonance shown in FIG. 6B. Here, the optical waveguide 4 comprises a PTE 12 located in the waveguide at the center plane with respect to the center of the cavity 16. The cavity 16 is of H0 type formed by shifting the airholes around the cavity away from the cavity center.

The structure of FIG. 5C exhibits a blue-parity Fano resonance shown in FIG. 6C. Here, the optical waveguide 4 comprises a PTE 12 located one lattice constant to the left of the center plane with respect to the cavity 16, hence breaking the mirror symmetry of the structure. The cavity 16 is of H0 type the same as FIG. 5B.

In the structures of FIG. 5A-5C, the waveguide is of W1-type formed by removing one row of airholes and shifting the inner most row of airholes towards the waveguide center. Assuming the same quality factor and cavity mode symmetry, the choice of quasi-H1 or H0 does not affect the lineshapes. However, an H0 cavity features larger mode confinement, and better overlap of the cavity mode with the material.

Hence, in a preferred embodiment, a spectral position of the minimum transmission through the waveguide-coupled cavity structure is determined by parameters such as the resonance frequency and the quality factor of the cavity in addition to the placement of the PTE.

Although waveguide-coupled cavity structures exhibiting symmetric Fano (inverse Lorentzian) resonance can be used for the conversion of phase-modulated signals to intensity-modulated signals, structures exhibiting asymmetric Fano resonance are often advantageous as a larger extinction ratio between the maximum and minimum transmission can be achieved. This can be exploited to achieve a more efficient suppression of the phase modulated sidebands. Therefore, in a preferred embodiment, the waveguide-coupled cavity structure exhibits a blue or a red parity Fano resonance.

Schematics of some setups for detecting coherent optical signals modulated according to different coherent modulation formats are shown in FIGS. 7A-C.

A proposed receiver setup 70 for direct detection of binary phase-shift keying (BPSK) signals is shown in FIG. 7A, in which the input BPSK signal is transmitted through a red-parity Fano device 2'. The output signal is then directly detected by a photodiode 12. The output photocurrent from the photodiode is then converted to voltage using transimpedance amplifier (TIA) 22. Different waveguide-coupled cavity structures can be used to convert a BPSK signal into intensity-modulated signal, based on either of symmetric or blue- or red-parity Fano resonances. This setup is similar to the receiver 1 described in relation to FIG. 4A.

The receiver setup 72 shown in FIG. 7B can be used for converting quadrature phase-shift keying (QPSK) signal to intensity modulated signal enabling direct detection of QPSK signal. The received optical signal is split into two arms by splitter 24, the arms containing structures exhibiting Fano resonances of opposite symmetry (red-parity structure 2' and blue parity structure 2"). The time-dependent optical power of the signals after the blue and red-parity Fano are detected using a balanced photodiode setup 21. A balanced photodiode 21 comprises two photodiodes connected in series. It is also referred to as a balanced optical receiver and is designed for comparing photocurrent differences between two correlated optical signals while suppressing any common fluctuations of the input signals. The difference in photocurrents is sent to a transimpedance amplifier 22, which produces an output voltage proportional to the difference in photocurrents.

Figure 8A:
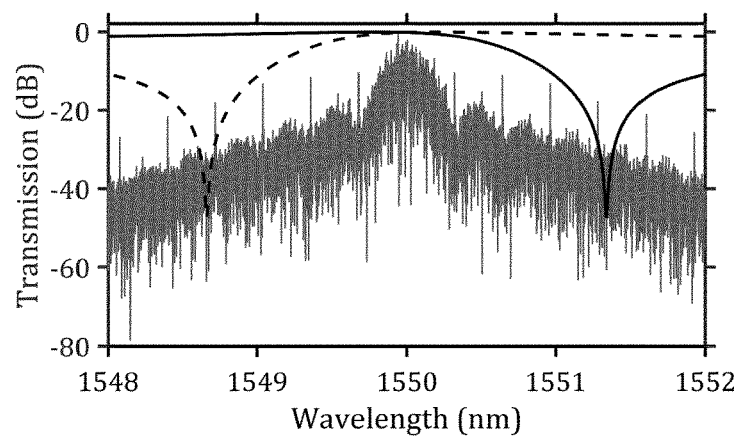
FIGS. 8A-D are graphs illustrating numerical simulation results demonstrating conversion of QPSK signal to intensity-modulated signal using Fano resonance according to an embodiment of this disclosure.
Figure 8B:
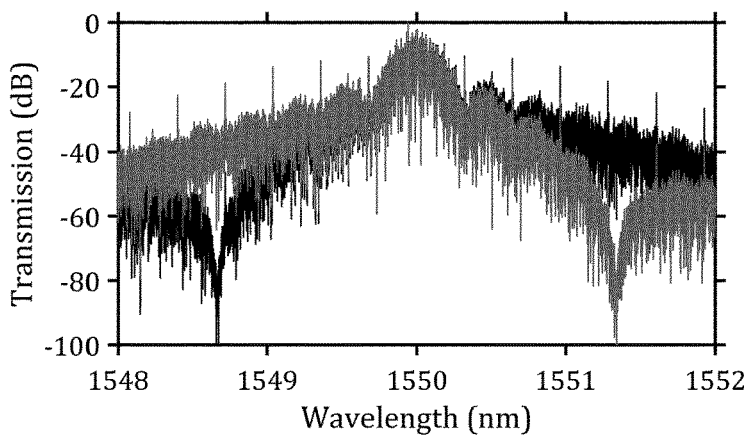
Figure 8C:
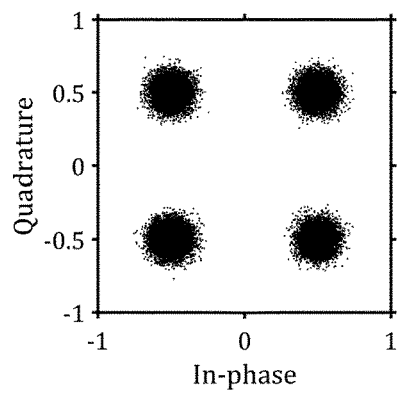
Figure 8D:
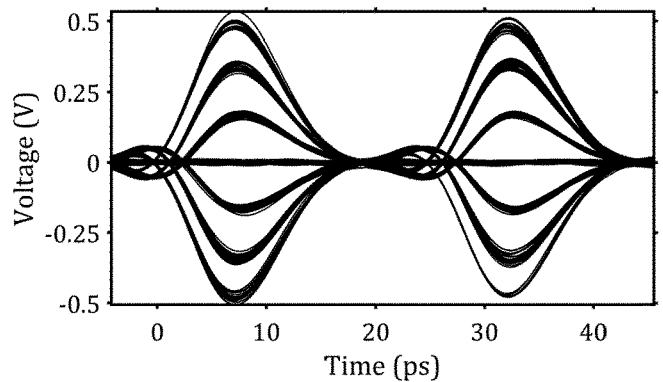

FIGS. 8A-D are graphs illustrating numerical simulation results demonstrating the conversion of QPSK signal to intensity-modulated signal using the setup of FIG. 7B. FIG. 8A shows the normalized optical spectrum of the QPSK signal (grey line) and the transmission spectra of blue-parity (dashed black line) and red-parity (solid black line) Fano resonances. FIG. 8B shows the normalized optical spectra of the signals after transmission through the blue-parity (black line) and red-parity (grey line) Fano resonances, respectively. FIG. 8C shows the constellation diagram of the input QPSK signal with 15 dB SNR. FIG. 8D shows the eye-diagram formed by superimposing the output voltage of 22 onto two symbol-slots is shown in FIG. 7(g). It shows seven-voltage levels corresponding to seven unique bit transitions.

Therefore, in a preferred embodiment, the optical receiver 72 is preferably configured to detect quadrature phase-shift keying signals in that it comprises:

- a first and a second waveguide-coupled cavity structure comprising respective first and second optical waveguides each having an input port for receiving an optical signal and an output port for providing an output optical signal, wherein the first waveguide-coupled cavity structure is configured to exhibit a blue-parity Fano resonance and the second waveguide-coupled cavity structure is configured to exhibit a red-parity Fano resonance and wherein the first and second waveguide-coupled cavity structures are designed for a transmission spectrum of the Fano resonances to overlap with a spectrum of the modulated coherent optical signal to suppress transmission of at least one sideband of the modulated coherent optical signal through the structure, the sideband suppression being asymmetrical with respect to the carrier frequency of the modulated coherent optical signal;
- a first splitter 24 for splitting the modulated coherent optical signal between the input ports of the first and second waveguide-coupled cavity structures; and
- a balanced photodiode setup being arranged at the outputs of the first and second waveguide-coupled cavity structures.

A proposed receiver setup 74 for direct detection of high order quadrature amplitude modulation (n-QAM) signals is shown in FIG. 7C. In addition to the phase detection, intensity detection is also required compared to QPSK signals. Therefore, the received signal is split into phase detection branch 75 and an amplitude detection branch 76 by splitter 26. The signal in the phase detection branch 75 is further split into two arms by splitter 24, the arms containing Fano devices of opposite parities similar to the setup for detection of QPSK signals described in relation to FIG. 7B above. The amplitude detection branch 76 is implemented using a direct detection scheme employing a photodiode 77 and TIA 78. High order quadrature amplitude modulation (n-QAM) are widely used for long-haul optical communication links due to their high system capacity, and increased spectral efficiency. Cost effective receivers that can detect n-QAM modulation formats are therefore highly needed.

Therefore, in a preferred embodiment, the optical receiver 74 is preferably configured to detect high order quadrature amplitude modulation signals in that it comprises, in addition to the optical receiver setup 72:

- a second 26 splitter for splitting the modulated coherent optical signal between a phase detection branch 75 and an amplitude detection branch 76, the phase detection branch 75 comprising the first splitter 24 arranged to receive the modulated coherent optical signal from the second splitter, the amplitude detection branch 76 comprising a photodetector arranged to receive an optical signal from the second splitter.

Figure 9:
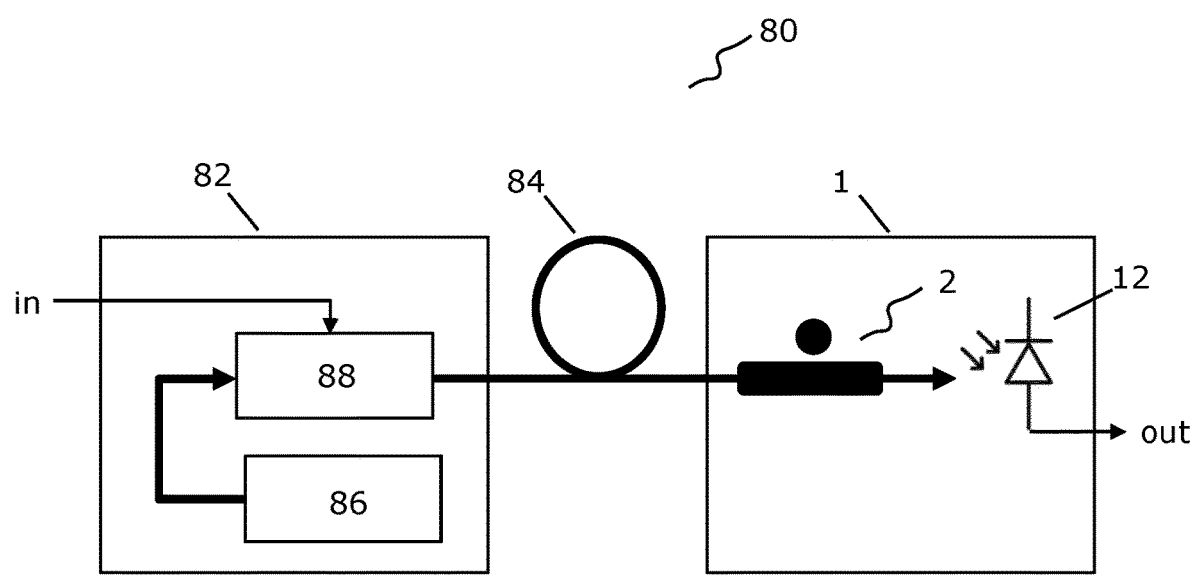
FIG. 9 illustrates an optical communication kit according to an embodiment of this disclosure.

In a further embodiment, the invention provides an optical communication kit 80 illustrated in FIG. 9. The optical communication kit 80 comprises an optical receiver 1 according to embodiments of the invention and an optical transmitter 82 comprising a coherent light source 86, typically a laser, and an optical modulator 88 for encoding incoming data onto light from the coherent light source to form a modulated coherent optical signal.

In an exemplary embodiment, the optical modulator 88 of the kit 80 comprises one or more optical phase modulators, such as solely optical phase modulators and no other modulators (e.g. an intensity modulator). In a method based on this embodiment, the coherent optical signal would be provided by modulating only the phase of an optical carrier signal without modulating the amplitude of the optical carrier signal. This embodiment is suitable for QPSK systems and provides the advantage that the modulated coherent optical signal is optimised for detection by the optical receiver according to embodiments of the invention, thereby improving the quality of the generated intensity modulated signal. This provides the further advantage of a simpler and cheaper system since the transmitter and receiver would involve less components.

In another exemplary embodiment, the optical modulator 88 comprises at least one optical phase modulator and at least one amplitude or intensity modulator. This embodiment allows transmission and detection of advanced modulation formats such as 16-QAM signals.

For advanced modulation formats such as n-QAM, the optical modulator 88 would also comprise an amplitude modulator or more generally an I-Q modulator. An optical network including a waveguide, such as optical fiber link, 84 receives the modulated coherent optical signal from the optical transmitter 82 and ultimately delivers it to the optical receiver 1. The optical receiver 1 is described in relation to FIG. 4A and receives and detects the modulated coherent optical signal to provide the data 'out' analogue to the encoded incoming data 'in'.

The invention claimed is:

1. An optical receiver for detecting a modulated coherent optical signal, comprising:
   - a waveguide-coupled cavity structure comprising an optical waveguide having an input port for receiving an optical signal and an output port for providing an output optical signal, wherein the waveguide-coupled cavity structure is configured to exhibit Fano resonance and wherein a transmission spectrum of the Fano resonance overlaps with a spectrum of a received modulated coherent optical signal to suppress transmission of at least one sideband of the modulated coherent optical signal through the waveguide-coupled cavity structure, the sideband suppression being asymmetrical with respect to a carrier frequency of the modulated coherent optical signal; and
   - a photodetector configured to receive the output optical signal from the output port.

2. The optical receiver according to claim 1, wherein a minimum in the transmission spectrum of the Fano resonance overlaps with a sideband of the modulated coherent optical signal.

3. The optical receiver according to claim 2, wherein the minimum in the transmission spectrum overlaps with a sideband of the modulated coherent optical signal having largest amplitude.

4. The optical receiver according to claim 1, wherein the waveguide-coupled cavity structure exhibits a blue or a red parity Fano resonance.

5. The optical receiver according to claim 1, wherein the optical waveguide supports a continuum of modes and, wherein the waveguide-coupled cavity structure comprises an optical cavity supporting a discrete mode with resonance frequency, $\omega_0$, with the optical waveguide being arranged within an optical distance of the optical cavity to allow evanescent excitation of the discrete cavity mode from the continuum of modes.

6. The optical receiver according to claim 5, further comprising a heating element configured to tune the resonance frequency of the optical cavity by thermo-optic effects.

7. The optical receiver according to claim 1, wherein the optical waveguide comprises a partially transmitting element (PTE).

8. The optical receiver according to claim 1, wherein the waveguide-coupled cavity structure is a ring resonator.

9. The optical receiver according to claim 8, further comprising an additional optical waveguide evanescently coupled to the waveguide-coupled cavity structure to provide a loss channel for radiation out of the ring resonator.

10. The optical receiver according to claim 1, wherein the waveguide-coupled cavity structure is a first waveguide-coupled cavity structure, which is configured to exhibit red-parity Fano resonance, the optical receiver further comprising:
a second waveguide-coupled cavity structure comprising an optical waveguide having an input port for receiving an optical signal and an output port for providing an output optical signal, wherein the second waveguide-coupled cavity structure is configured to exhibit blue-parity Fano resonance and wherein a transmission spectrum of the blue-parity Fano resonance overlaps with a spectrum of a received modulated coherent optical signal to suppress transmission of at least one sideband of the modulated coherent optical signal through the second waveguide-coupled cavity structure, the sideband suppression being asymmetrical with respect to a carrier frequency of the modulated coherent optical signal;
a first splitter for splitting the modulated coherent optical signal between the input ports of the first and second waveguide-coupled cavity structures; and
a balanced photodiode comprising the photodetector and being arranged at the outputs of the first and second waveguide-coupled cavity structures.

11. The optical receiver according to claim 10, further comprising:
a second splitter for splitting the modulated coherent optical signal between a phase detection branch and an amplitude detection branch, the phase detection branch comprising the first splitter arranged to receive the modulated coherent optical signal from the second splitter, the amplitude detection branch comprising a photodetector arranged to receive an optical signal from the second splitter.

12. An optical communication kit comprising:
an optical transmitter comprising a coherent light source and at least one optical phase modulator for encoding data onto light from the coherent light source to form a modulated coherent optical signal; and
an optical receiver according to claim 1 for receiving and detecting the modulated coherent optical signal.

13. The optical communication kit according to claim 12, wherein the optical transmitter comprises only one or more optical phase modulators for encoding data.

14. The optical communication kit according to claim 12, wherein the optical transmitter further comprises at least one optical intensity modulator for encoding data.

15. A method for detecting a modulated coherent optical signal, comprising:
coupling the coherent optical signal into an optical waveguide of a waveguide-coupled cavity structure configured to exhibit Fano resonance, wherein a transmission spectrum of the Fano resonance overlaps with a spectrum of the coherent optical signal to suppress transmission of at least one sideband of the coherent optical signal through the optical waveguide, the sideband suppression being asymmetrical with respect to a carrier frequency of the coherent optical signal; and
detecting an intensity modulation of an output from the waveguide-coupled cavity structure.

16. An optical format converter for converting a phase modulation format of a modulated coherent optical signal into an intensity modulation format, comprising a waveguide-coupled cavity structure comprising an optical waveguide having an input port for receiving an optical signal and an output port for providing a converted output optical signal, wherein the waveguide-coupled cavity structure is configured to exhibit Fano resonance and wherein a transmission spectrum of the Fano resonance overlaps with a spectrum of a received modulated coherent optical signal to suppress transmission of at least one sideband of the modulated coherent optical signal through the waveguide-coupled cavity structure, the sideband suppression being asymmetrical with respect to a carrier frequency of the modulated coherent optical signal.

17. The optical format converter according to claim 16, wherein a minimum in the transmission spectrum of the Fano resonance overlaps with a sideband of the modulated coherent optical signal.

18. The optical format converter according to claim 16, wherein the minimum in the transmission spectrum overlaps with a sideband of the modulated coherent optical signal having largest amplitude.

19. The optical format converter according to claim 16, wherein the waveguide-coupled cavity structure exhibits a blue or a red parity Fano resonance.

20. The optical format converter according claim 16, wherein the optical waveguide supports a continuum of modes and wherein the waveguide-coupled cavity structure comprises an optical cavity supporting a discrete mode with resonance frequency, @0, with the optical waveguide being arranged within an optical distance of the optical cavity to allow evanescent excitation of the discrete cavity mode from the continuum of modes.

21. The optical format converter according to claim 20, further comprising a heating element configured to tune the resonance frequency of the optical cavity by thermo-optic effects.

22. The optical format converter according to claim 16, wherein the optical waveguide comprises a partially transmitting element (PTE).

23. The optical format converter according to claim 16, wherein the waveguide-coupled cavity structure is a ring resonator.

24. The optical format converter according to claim 23, further comprising an additional optical waveguide evanescently coupled to the waveguide-coupled cavity structure to provide a loss channel for radiation out of the ring resonator.

25. A method for converting a phase-modulation on a coherent optical signal into an intensity-modulation of the optical signal, comprising coupling the coherent optical signal into an optical waveguide of a waveguide-coupled cavity structure configured to exhibit Fano resonance, wherein a transmission spectrum of the Fano resonance overlaps with a spectrum of the coherent optical signal to suppress transmission of at least one sideband of the coherent optical signal through the optical waveguide, the sideband suppression being asymmetrical with respect to a carrier frequency of the coherent optical signal.

* * * * *